United States Patent
He et al.

(10) Patent No.: US 12,284,680 B2
(45) Date of Patent: Apr. 22, 2025

(54) METHODS AND APPARATUS FOR PRACH RESOURCE DETERMINATION AND RA-RNTI COMPUTATION IN WIRELESS COMMUNICATION

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 396 days.

(21) Appl. No.: 17/456,304

(22) Filed: Nov. 23, 2021

(65) Prior Publication Data
US 2022/0225416 A1    Jul. 14, 2022

Related U.S. Application Data

(60) Provisional application No. 63/137,382, filed on Jan. 14, 2021.

(51) Int. Cl.
*H04W 74/0833* (2024.01)
*H04W 72/0446* (2023.01)
*H04L 27/26* (2006.01)

(52) U.S. Cl.
CPC ... *H04W 74/0833* (2013.01); *H04W 72/0446* (2013.01); *H04L 27/26025* (2021.01)

(58) Field of Classification Search
CPC ......... H04W 72/0446; H04W 72/0453; H04W 74/00; H04W 74/0833; H04L 27/2602; H04L 27/2605
See application file for complete search history.

(56) References Cited

U.S. PATENT DOCUMENTS

2016/0381715 A1\* 12/2016 Lee .................. H04W 74/0841
                                                                    370/329
2018/0338308 A1   11/2018 Park
(Continued)

OTHER PUBLICATIONS

"Physical channels and modulation (Release 16)," 3GPP TSG RAN, vol. RAN WG1, No. V16.4.0, Jan. 8, 2021 (Jan. 8, 2021), XP051999684, Retrieved from the Internet: URL: https://ftp.3gpp.org/Specs/archive/38_series/38.211/38211-g40.zip 38211-g40.docx [retrieved on Jan. 8, 2021].

(Continued)

*Primary Examiner* — Jeong S Park
(74) *Attorney, Agent, or Firm* — Blank Rome LLP

(57) ABSTRACT

Aspects herein relate to wireless devices, circuits, and methods for determining a PRACH resource mapping comprising a starting symbol position within a reference slot, wherein the starting symbol position is determined based, at least in part, on a subcarrier spacing configuration of PRACH resources of a wireless network that a wireless device is operating on; and using the radio to transmit a RACH preamble and an associated RA-RNTI via the determined PRACH resource mapping. Further aspects herein relate to devices, circuits, and methods for using a modified RA-RNTI for transmission or reception of data over a wireless network, wherein the wireless network has a subcarrier spacing configuration of PRACH resources, wherein a size of the subcarrier spacing configuration of the PRACH resources causes out-of-range RA-RNTI values to be calculated using a legacy RA-RNTI equation in an unmodified form, wherein the range of permissible RA-RNTI values is from 0 to $2^{16}-1$.

5 Claims, 11 Drawing Sheets

(56) References Cited

U.S. PATENT DOCUMENTS

| | | | |
|---|---|---|---|
| 2020/0008247 A1* | 1/2020 | Kwak | H04B 7/0695 |
| 2020/0275398 A1* | 8/2020 | Da | H04L 5/0048 |
| 2021/0112599 A1* | 4/2021 | Gao | H04W 74/08 |
| 2021/0160912 A1* | 5/2021 | Fakoorian | H04W 72/23 |
| 2021/0204326 A1* | 7/2021 | Zhang | H04W 72/0446 |
| 2021/0250986 A1* | 8/2021 | Luo | H04L 27/26025 |
| 2022/0078718 A1* | 3/2022 | Hoshino | H04W 72/02 |
| 2022/0110161 A1* | 4/2022 | Christoffersson | H04W 74/0833 |
| 2022/0369378 A1* | 11/2022 | Awad | H04W 74/0833 |
| 2023/0336386 A1* | 10/2023 | Kurita | H04L 27/26025 |

OTHER PUBLICATIONS

"Physical layer procedures for control (Release 16)," 3GPP TSG RAN, vol. RAN WG1, No. V16.4.0, Jan. 8, 2021 (Jan. 8, 2021), XP051999687, Retrieved from the Internet: URL: https://ftp.3gpp.org/Specs/archive/38_series/38.213/38213-g40.zip 38213-g40.docx [retrieved on Jan. 8, 2021].

* cited by examiner

METHODS AND APPARATUS FOR PRACH RESOURCE DETERMINATION AND RA-RNTI COMPUTATION IN WIRELESS COMMUNICATION

FIELD

The present application relates to wireless devices and wireless networks, including devices, circuits, and methods for Physical Random Access Channel (PRACH) resource determination and Random Access Radio Network Temporary Identifier (RA-RNTI) computation in wireless communication systems.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) New Radio (NR) communication. Accordingly, improvements in the field in support of such development and design are desired.

SUMMARY

NR specifications that have been developed in 3GPP Release-15 and Release-16 define wireless communication operations for frequencies up to 52.6 GHz, where all physical layer channels, signals, procedures, and protocols are designed to be optimized for uses under 52.6 GHz. To exploit the available and unlicensed spectrum above 52.6 GHz frequency (e.g., including the so-called NR-U unlicensed spectrum) for operation with NR systems, Release-17 study items have been commissioned to study supporting NR from 52.6 GHz to 71 GHz.

However, frequencies above 52.6 GHz are faced with more difficult challenges, such as higher phase noise, larger propagation loss due to high atmospheric absorption, and lower power amplifier efficiency. More specifically, to mitigate the problem of higher phase noise, the largest subcarrier spacing (SCS) maybe increased, e.g., from 120 kHz to 480 kHz or even higher (e.g., 960 kHz). However, the data processing time and HARQ-ACK feedback timing may not scale down linearly for the higher SCS, e.g., 480/960 kHz SCSs, as compared to legacy SCSs, as discussed and concluded in the legacy NR system designs.

Thus, there is a clear need to develop solutions for RA-RNTI determination (and other parameters) for the cases of 480 kHz or 960 kHz SCS on the frequency band above 52.6 GHz. In addition, new solutions are needed to support determination of PRACH symbol locations with 480 kHz SCS and/or 960 kHz (or higher) SCS, while balancing between signaling overhead and initial access latency performance.

According to certain aspects of this disclosure, a reference subcarrier spacing may be introduced to number the PRACH slots in a PRACH. According to certain aspects of this disclosure, a variety of approaches can be considered to determine the symbol position(s) of PRACH Occasions (POs) within a so-called "reference SCS" slot. According to certain aspects of this disclosure, different solutions may also be employed to determine the RA-RNTI values to address value out-of-range problems that may occur when using existing, i.e., legacy, RA-RNTI computation equations.

Aspects disclosed herein relate to wireless devices, circuits, and methods for determining a PRACH resource mapping, wherein the determined PRACH resource mapping comprises a starting symbol position within a reference slot, and wherein the starting symbol position is determined based, at least in part, on a subcarrier spacing configuration of PRACH resources of a wireless network that a wireless device is operating on; and using the radio to transmit a RACH preamble and associated RA-RNTI via the determined PRACH resource mapping.

According to other aspects, network devices, circuits, and methods for using a radio to receive a RACH preamble and associated RA-RNTI from a wireless device via a determined PRACH resource mapping, wherein the determined PRACH resource mapping comprises a starting symbol position within a reference slot, and wherein the starting symbol position is determined based, at least in part, on a subcarrier spacing configuration of PRACH resources of a wireless network that the wireless device is operating on; and use the radio to transmit a Downlink Control Information (DCI) message scrambled with the received RA-RNTI to the wireless device.

Further aspects disclosed herein relate to devices, circuits, and methods for using a modified RA-RNTI for transmission or reception of data over a wireless network, wherein the wireless network has a subcarrier spacing configuration of PRACH resources, wherein a size of the subcarrier spacing configuration of the PRACH resources causes out-of-range RA-RNTI values to be calculated using a legacy RA-RNTI equation in an unmodified form, wherein the range of permissible RA-RNTI values is from 0 to $2^{16}-1$, i.e., values up to 65,535.

The techniques described herein may be implemented in and/or used with a number of different types of devices, including but not limited to cellular phones, wireless devices, wireless base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
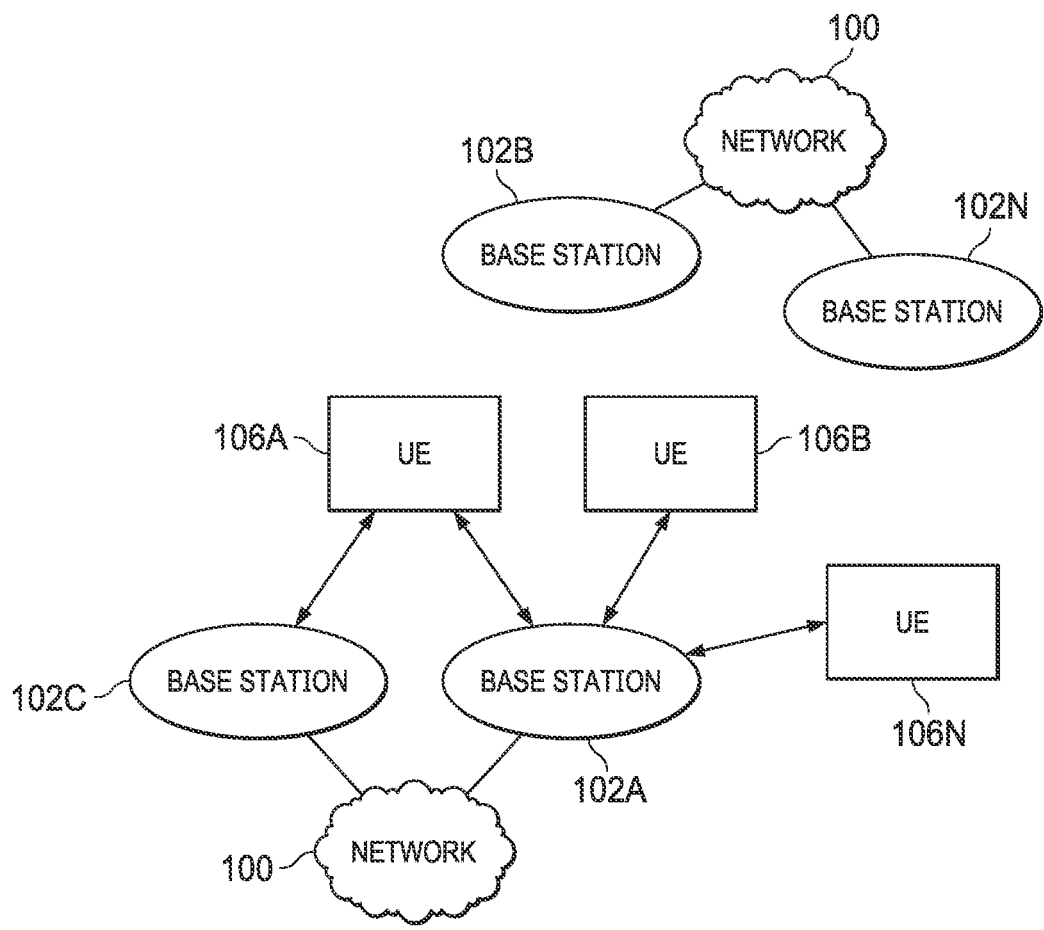
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In 5G/NR systems, the RA-RNTI is calculated using the following legacy equation: $1+s\_id+(14\times t\_id)+(14\times 80\times f\_id)+(14\times 80\times 8\times ul\_carrier\_id)$, wherein s_id is the index of the first Orthogonal Frequency Division Multiplexing (OFDM) symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of μ specified in clause 5.3.2 in Technical Specification 38.211, f_id is the index of the PRACH occasion in the frequency domain ($0 \leq f\_id < 8$), and ul_carrier_id is the uplink (UL) carrier used for Random Access (RA) Preamble transmission (using a value of 0 for Normal UL carrier, and 1 for Supplemental UL carrier).

Increasing the SCS of PRACH resources to 480/960 kHz for frequencies 52.6 GHz or higher may cause an RA-RNTI shortage or "out-of-range" problem. In Rel-15/16, the range of RA-RNTI for Msg-2 scheduling is 1 to 17,920, which is within the range that may be represented by 16 bits of information, i.e., less than a value of $2^{16}-1$, or 65,535. Similarly, for MsgB RNTI, the range is from 17,920 to 35,840, which is also less than 65,535. However, if SCSs of 480 kHz or even 960 kHz (or higher) are supported, the maximum possible value for the associated RA-RNTI would be increased to 71,680 (i.e., 17920*4, for a 480 kHz SCS)—or even 143,360 (i.e., 17920*8, for a 960 kHz SCS). Clearly, the requested RA-RNTI value range would far exceed the 16-bit width of RA-RNTI in current system. Similarly, for MsgB-RNTI, the range would be further increased to 286,720—also beyond the 16-bit range of the current system.

Thus, there is clear need to develop solutions for RA-RNTI determination for the case of 480 kHz or 960 kHz (or other) SCS on the frequency band above 52.6 GHz. In addition, one more fundamental issue needing to be addressed in order to support 480 kHz and 960 kHz SCS is how to determine the PRACH symbol locations, while balancing between signaling overhead and initial access latency performance.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the terms "UE" or "UE device" or "user device" can be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
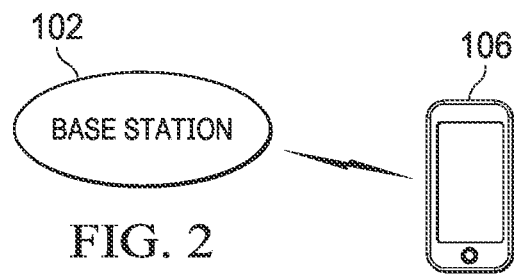
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106.

The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 106 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
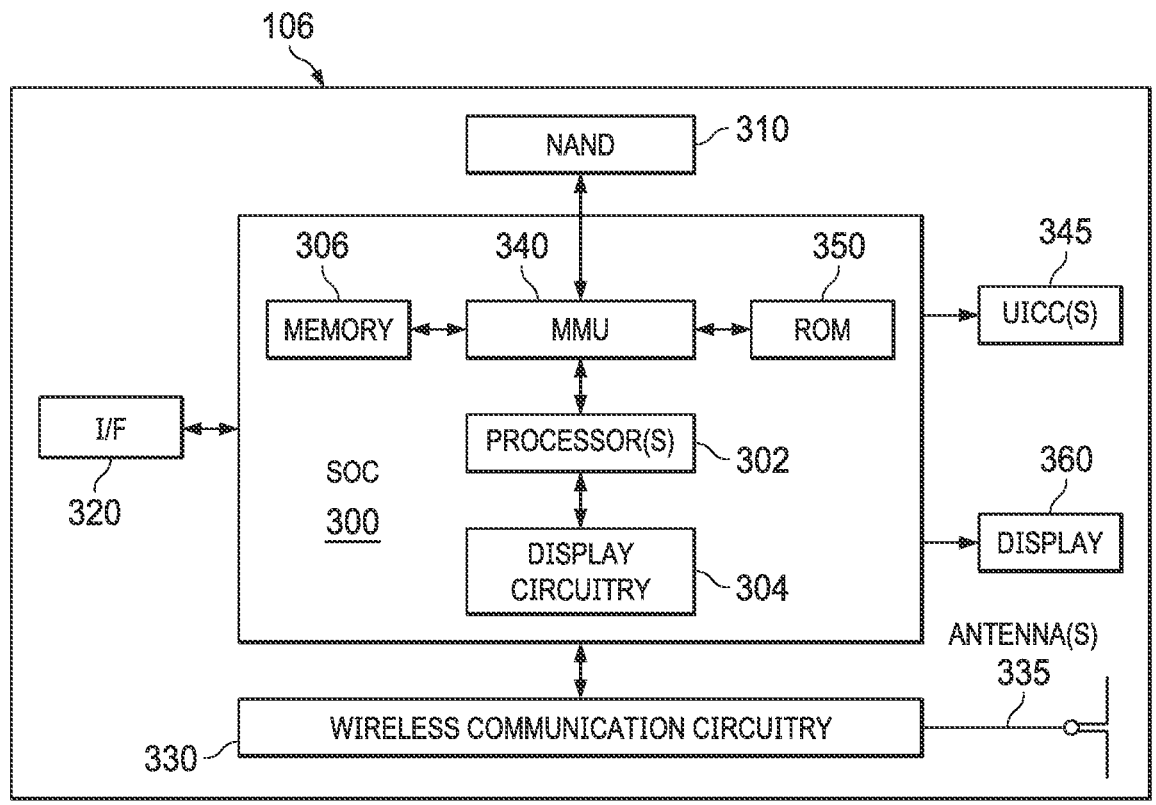
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
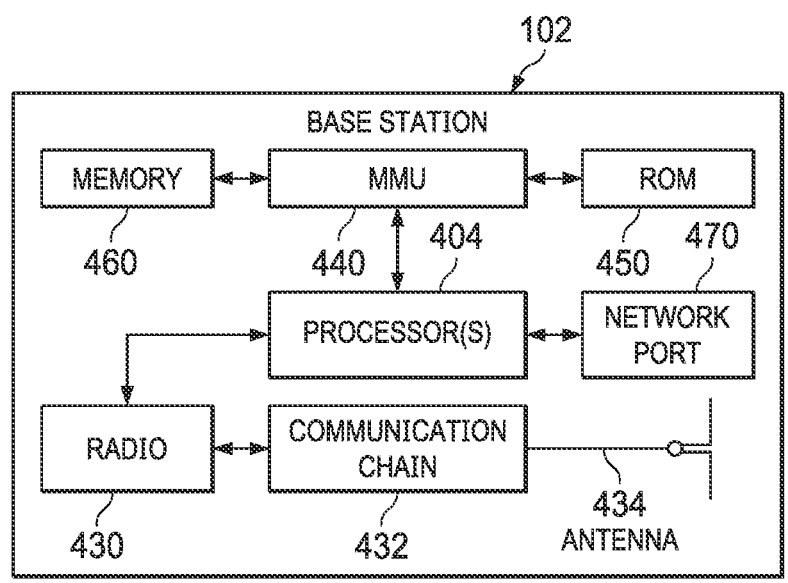
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to SGNR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
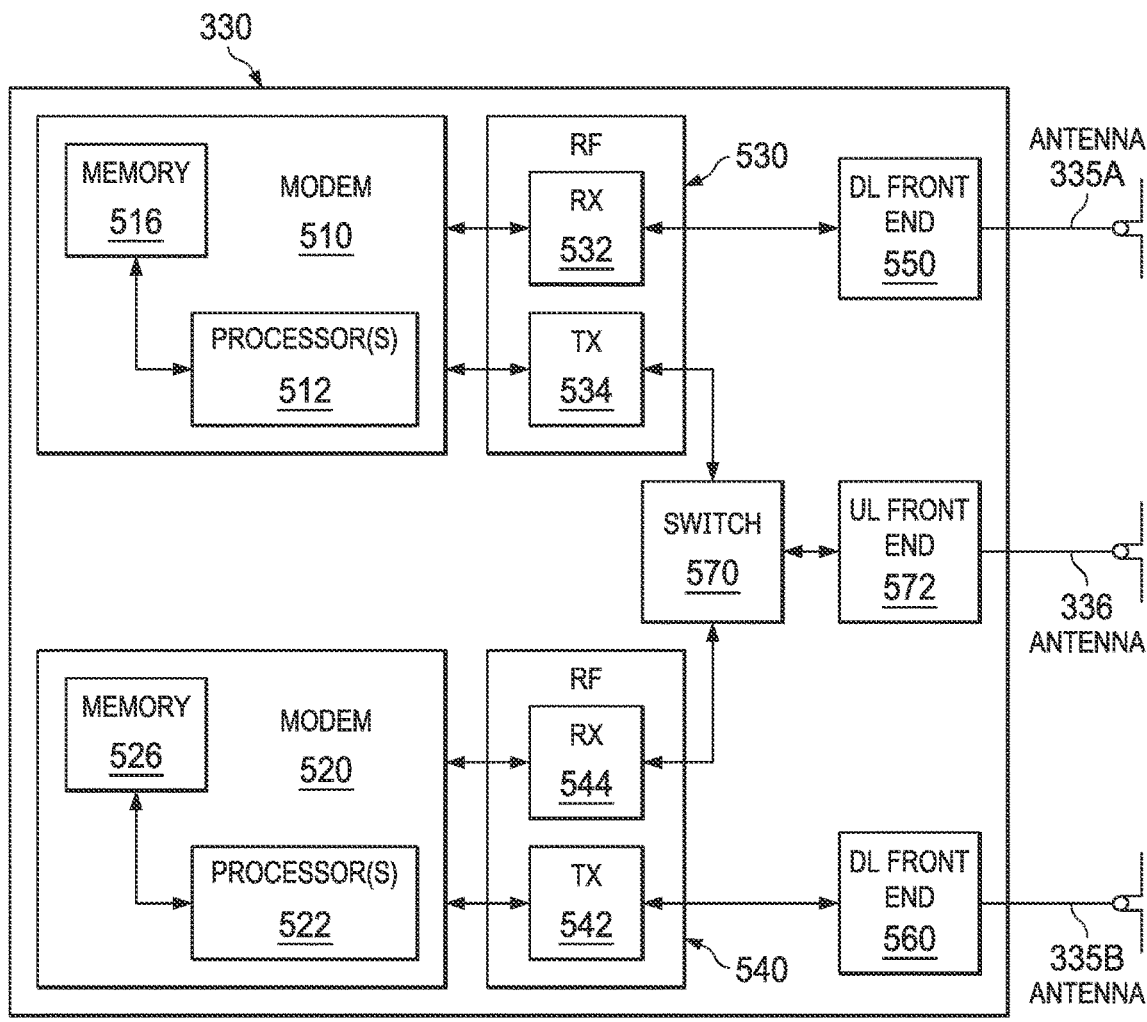
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible.

According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
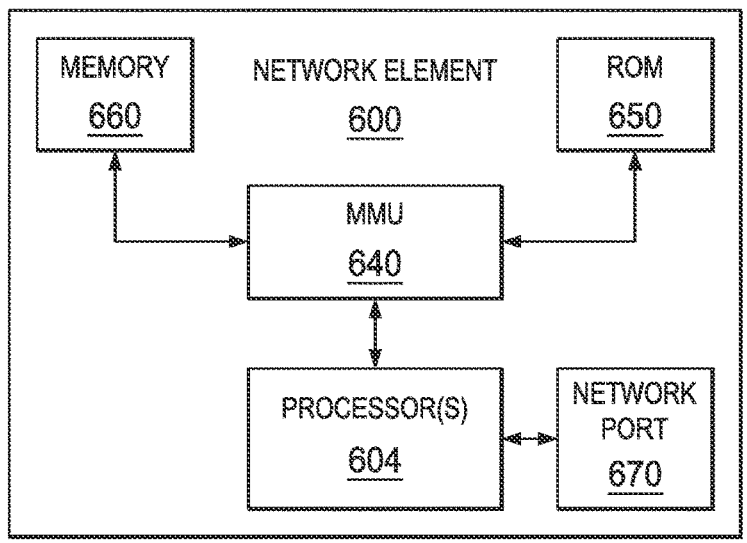
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
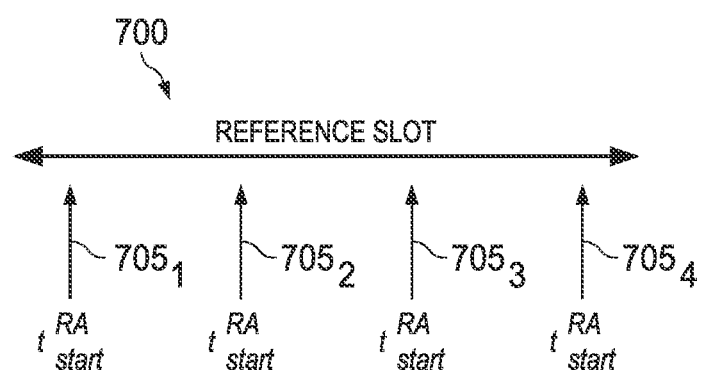
FIG. 7 illustrates a timeline showing an exemplary reference slot for PRACH, according to some aspects.

Symbol Position Determination for Physical Random Access Channel (PRACH) Occasions (POs) within a Reference Slot Turning now to FIG. 7, a timeline showing an exemplary reference slot 700 for PRACH is illustrated, according to some aspects. According to certain aspects of this disclosure, the following values may be used for PRACH resource mapping and determination. A "reference" subcarrier spacing may be introduced to number the PRACH slots in the time domain for PRACH resource(s) determination. In some designs, a reference subcarrier spacing, $\Delta_{ref}$=60 kHz or 120 kHz, may be used for the purpose of slot numbering for PRACH slot index determination. For PRACH resource SCSs having larger values, e.g., 240, 480, or 960 kHz, etc., the starting position, $t_{start}^{RA}$ (various examples of which are shown at $705_1$, $705_2$, $705_3$, and $705_4$ in FIG. 7), of the PRACH preamble may be defined with respect to a reference slot (e.g., a 60 kHz or 120 kHz reference slot), and given by the following equations:

$$t_{start}^{RA} = t_{start,l}^{\mu}, \text{ where}$$

$$t_{start,l}^{\mu} = 0 \text{ (when } l=0\text{), and}$$

$$T_{start,l}^{\mu} = t_{start,l-1}^{\mu} + (N_{\mu}^{\mu} + N_{CP,l-1}^{\mu}) \times T_c \text{ (when } l=\text{otherwise)}.$$ A reference slot may be assumed to start at t=0. A timing advance value, $N_{TA}$ of 0 shall be assumed. $N_{\mu}^{\mu}$ and $N_{CP,l-1}^{\mu}$ are defined as in Rel-15, and may be reused depending on the SCS configuration parameter, μ (where, e.g., μ=4 corresponds to 240 kHz SCS, μ=5 corresponds to 480 kHz SCS, μ=6 corresponds to 960 kHz SCS, and so forth). In some aspects, the symbol position, l, may also be a function of the SCS configuration, as will be described in greater detail below.

For example, according to a first aspect, Table 6.3.3.2-4 for random access configuration in Technical Specification 38.211 may be reused. However, for the cases of $\Delta f_{ra}$=240, 480, or 960 kHz, the value of current column labeled 'Number of RACH slots within a 60 kHz slot', denoted as 'P,' could be redefined as 'Number of RACH slots within a reference SCS slot' instead. In some designs, the reference SCS may be hard-encoded in the specification as 60 kHz (or 120 kHz) for new SCS on Frequency Range 2 (FR2). Further, the symbol position, l, may be given as follows: $l=l_0+n_t^{RA}N_{dur}^{RA}+14n_{slot}^{RA}$, where $l_0$ is given by the parameter "starting symbol" in Table 6.3.3.2-4, $n_t^{RA}$ is the PRACH transmission occasion within the PRACH slot, numbered in increasing order from 0 to $N_t^{RA,slot}-1$ within a RACH slot, where $N_t^{RA,slot}$ is also given in Table 6.3.3.2-4, and $N_{dur}^{RA}$ is the PRACH duration given by Table 6.3.3.2-4.

Various techniques may be employed to determine the value of $n_{slot}^{RA}$, that is, the number of PRACH occasions in a reference slot. According to a first aspect, values of $n_{slot}^{RA}$ may be limited to either 0 or 1, which would provide for the same number of PRACH occasions within a reference SCS slot (e.g., a 60 kHz or 120 kHz SCS) as is used in current system design for $\Delta f_{ra}$ values of 60 or 120 kHz.

In a second aspect, e.g., for $\Delta f_{ra}$ values of 240, 480, or 960 kHz, the value of $n_{slot}^{RA}$ may be defined as l×$\Delta_s$, wherein $\Delta_s=(\Delta f_{ra}/(\Delta_{ref} \times P))$, where l is in the range 0, . . . , P-1, where $\Delta_{ref}$ is the reference SCS, and P is the "number of PRACH slots within a reference SCS slot," and provided by repurposing the "number of PRACH slots within a 60 kHz SCS slot" column from Table 6.3.3.2-4, as discussed above. One benefit of this second aspect's approach is that it can more evenly distribute the PRACH occasions across slots within a reference SCS slot, e.g., as compared to the first aspect described above.

In a third aspect, e.g., for $\Delta f_{ra}$ values of 240, 480, or 960 kHz, all of the slots within a reference SCS slot may be used as PRACH slots and may be available for PRACH transmission. According to this third aspect, the PRACH capability of the system increases linearly with the ratio between $\Delta f_{ra}$ and $\Delta_{ref}$. The symbol position, l, may then be given as follows: $l=l_0+n_t^{RA}N_{dur}^{RA}+14K$, wherein K is in the range of 0, 1, . . . ($(\Delta f_{ra}/\Delta_{ref})-1$).

Figure 8A:
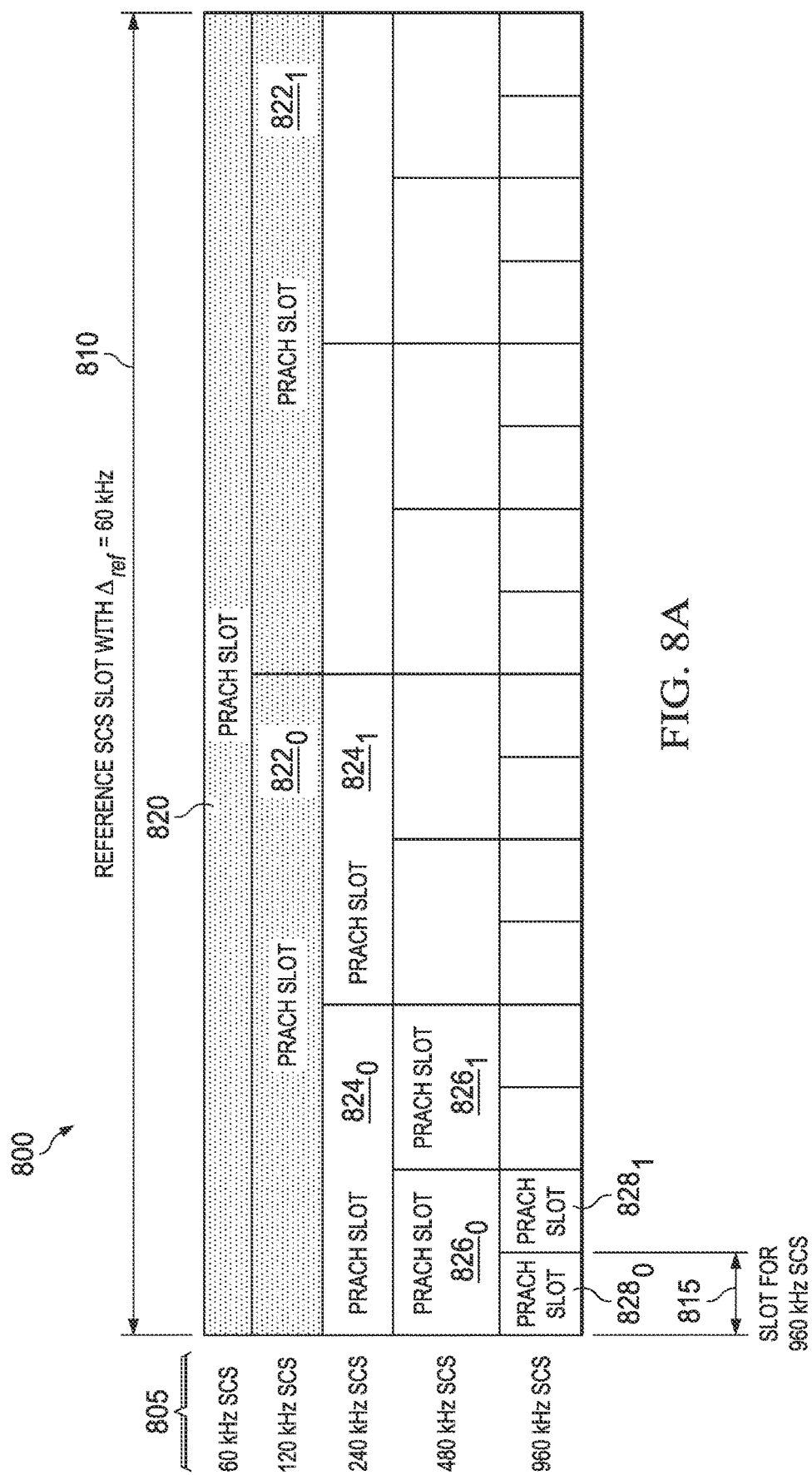
FIGS. 8A-8C illustrate various timelines showing exemplary PRACH slot positions within a reference SCS slot for different SCSs, according to some aspects.
Figure 8D:
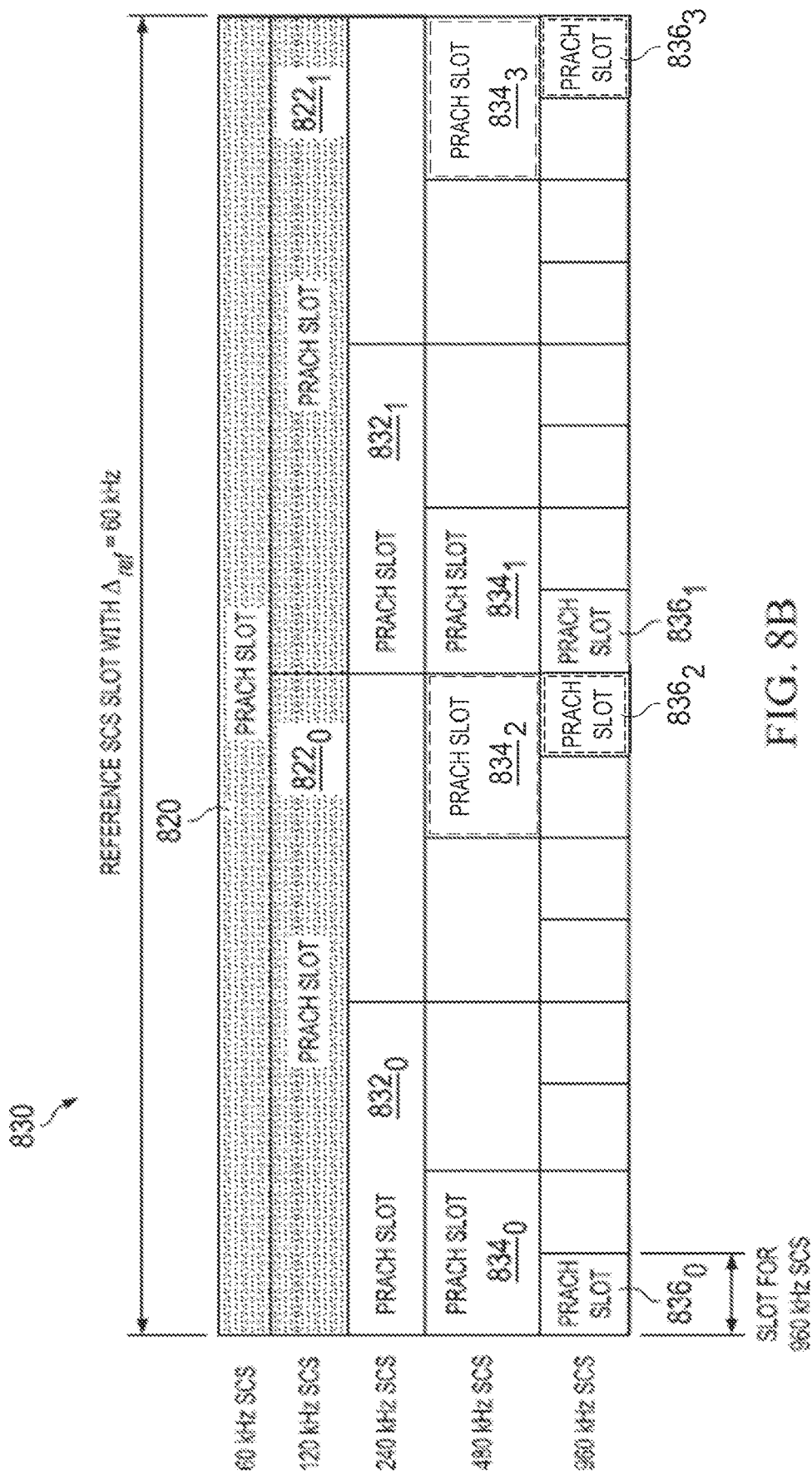
Figure 8C:
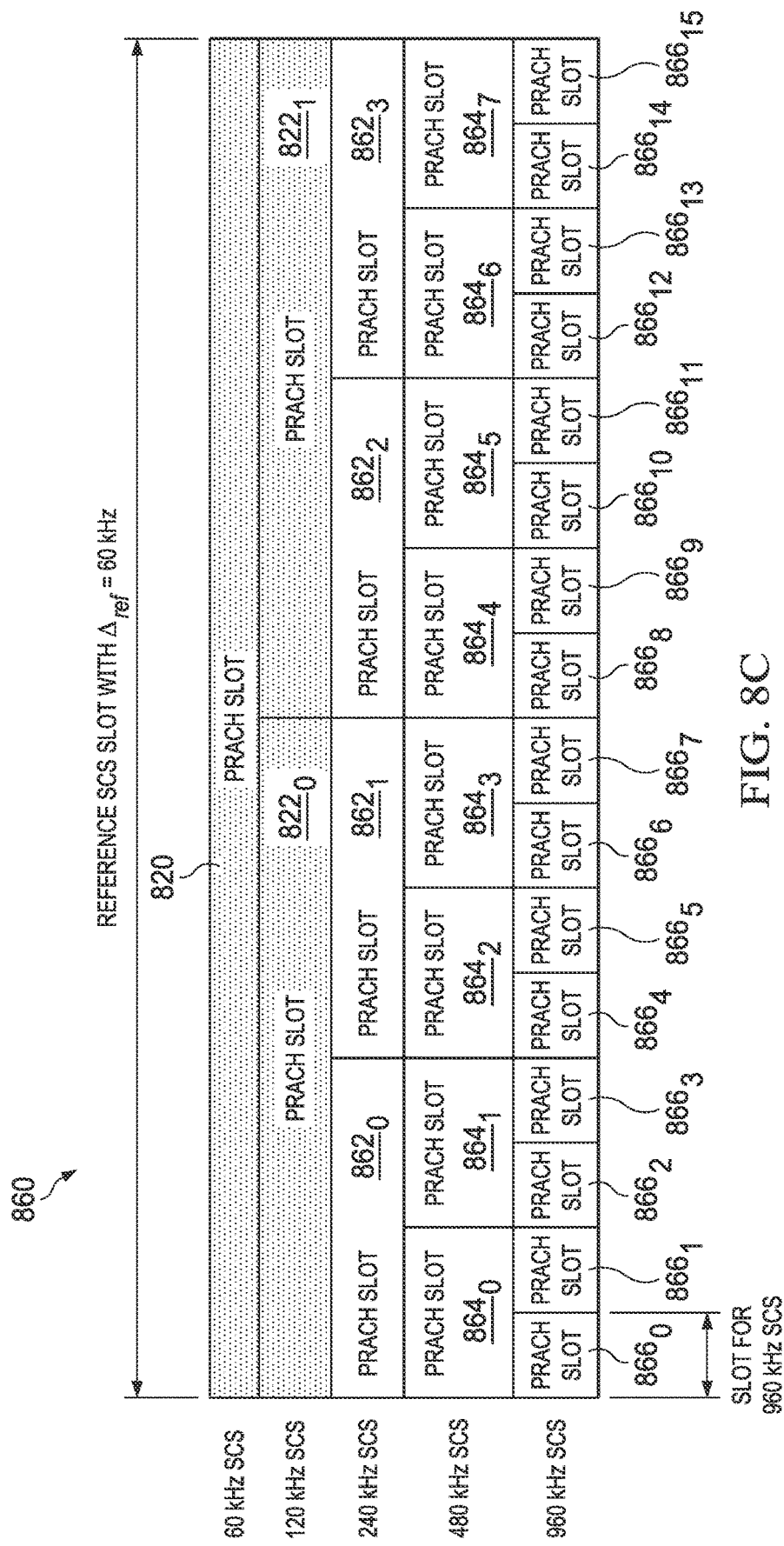

FIGS. 8A-8C illustrate various timelines showing exemplary PRACH slot positions within a reference SCS slot for different SCSs, according to some aspects. Timeline 800 of FIG. 8A illustrates the first aspect described above. Time is shown across the horizontal axis 810, which represents the duration of a reference SCS slot 820 with $\Delta_{ref}$=60 kHz. Descending down the vertical axis 805 are exemplary symbol position (and, by extension, slot position) determinations for PRACH Occasions with SCSs of $\Delta f_{ra}$=60 kHz, 120 kHz, 240 kHz, 480 kHz, and, finally, 960 kHz, in the bottom row of timeline 800. As illustrated, with a 120 kHz SCS, the reference PRACH slot 820 may be divided into two slots, $822_0$ and $822_1$. Likewise, with a 240 kHz SCS, the reference PRACH slot 820 may be divided into four slots, the first two of which, $824_0$ and $824_1$, may be used for PRACH occasions; with a 480 kHz SCS, the reference PRACH slot 820 may be divided into eight slots, the first two of which, $826_0$ and $826_1$, may be used for PRACH occasions; and, with a 960 kHz SCS, the reference PRACH slot 820 may be divided into sixteen slots, the first two of which, $828_0$ and $828_1$, may be used for PRACH occasions. As may now be appreciated, with each increasing of the SCS for the PRACH resources, the corresponding slot length will decrease in a linear fashion (e.g., with each doubling of the SCS, the PRACH slot duration is halved, culminating with the slot length for 960 kHz SCS (815) having the shortest illustrated PRACH slot length). According to the first aspect shown in timeline 800, for each possible SCS, there are only 2 PRACH slots per reference slot, and they are concentrated at the earliest in time slots within the reference slot.

Turning now to timeline 830 of FIG. 8B, the second aspect described above is illustrated. Again, time is shown across the horizontal axis, and a reference SCS slot with $\Delta_{ref}$=60 kHz is used. Descending down the vertical axis are again exemplary symbol position determinations for PRACH Occasions with SCSs of $\Delta f_{ra}$=60 kHz, 120 kHz, 240 kHz, 480 kHz, and, finally, 960 kHz, in the bottom row of timeline 830. As illustrated, with a 120 kHz SCS, the reference PRACH slot 820 is again divided into two slots, $822_0$ and $822_1$. With a 240 kHz SCS, the reference PRACH slot 820 may be divided into four slots, the first and third of which, $832_0$ and $832_1$, may be used for PRACH occasions; with a 480 kHz SCS, the reference PRACH slot 820 may be divided into eight slots, the first and fourth of which, $834_0$ and $834_1$, may be used for PRACH occasions; and, with a 960 kHz SCS, the reference PRACH slot 820 may be divided into sixteen slots, the first and eighth of which, $836_0$ and $836_1$, may be used for PRACH occasions. According to the second aspect shown in timeline 830, for each possible SCS, there are again only 2 PRACH slots per reference slot, but they are evenly-distributed in time across the available PRACH slots within the reference slot, which may improve latency performance for UE initial access. In particular, a given UE may be operating in a discontinuous reception (DRX) mode, i.e., causing it to power down at different times, so it may not be optimal to concentrate all the PRACH occasions in the beginning of the slots (as was shown in timeline 800).

As stated above, the PRACH Occasion positions illustrated in FIG. 8B are merely exemplary, and other schemes of evenly-distributing the selected number of PRACH slots per reference slot according to the second aspect described above are also possible. For example, with a 480 kHz SCS, wherein the reference PRACH slot 820 may be divided into eight slots, rather than using the first and fourth positions for the PRACH occasions (i.e., 834$_0$ and 834$_1$), a given implementation may instead use the fifth and eighth positions (i.e., 834$_2$ and 834$_3$) to evenly distribute the PRACH occasions. Other distributions are possible, as well. For example, if a given implantation used 4 PRACH slots per reference slot, the odd-numbered positions (i.e., first, third, fifth, seventh) may be used for the PRACH occasions, or, alternatively, the even-numbered symbol positions may be used (i.e., second, fourth, sixth, eighth), and so on.

Similarly, with a 960 kHz SCS, wherein the reference PRACH slot 820 may be divided into sixteen slots, rather than using the first and ninth positions for the PRACH occasions (i.e., 836$_0$ and 836$_1$), a given implementation may instead use the eighth and sixteenth symbol positions (i.e., 836$_2$ and 836$_3$) to evenly distribute the PRACH occasions. In other words, however many "portions" the reference SCS slot is divided into, i.e., based on the determined number of PRACH occasions to be distributed evenly across the reference slot, the PRACH occasions may be placed at any desired position index within a given portion of the reference SCS, e.g., the first index position of each portion (i.e., as with 836$_0$ and 836$_1$), the last index position of each portion (i.e., as with 836$_2$ and 836$_3$), the second index position of each portion, the fourth index position of each portion, and so forth.

Turning now to timeline 860 of FIG. 8C, the third aspect described above is illustrated. Again, time is shown across the horizontal axis, and a reference SCS slot with $\Delta_{ref}=60$ kHz is used. Descending down the vertical axis are again exemplary symbol position determinations for PRACH Occasions with SCSs of $\Delta f_{ra}=60$ kHz, 120 kHz, 240 kHz, 480 kHz, and, finally, 960 kHz, in the bottom row of timeline 860. As illustrated, with a 120 kHz SCS, the reference PRACH slot 820 is again divided into two slots, 822$_0$ and 822$_1$. However, with a 240 kHz SCS, the reference PRACH slot 820 may be divided into four slots, each of which, 862$_0$-862$_3$, may be used for PRACH occasions; with a 480 kHz SCS, the reference PRACH slot 820 may be divided into eight slots, each of which, 864$_0$-864$_7$, may be used for PRACH occasions; and, with a 960 kHz SCS, the reference PRACH slot 820 may be divided into sixteen slots, each of which, 866$_0$-866$_{15}$, may be used for PRACH occasions. According to the third aspect shown in timeline 860, for each possible SCS, each of the PRACH slots within the reference slot is available to serve as a PRACH occasion, which may increase PRACH capacity by 4×, 8×, 16×, etc., as compared to the number available in a reference 60 kHz SCS configuration, which may be useful to accommodate the requests of massive numbers of IoT devices (e.g., within an industrial warehouse) attempting to connect to a gNB and/or in the case of beam management for PRACH access.

Figure 9:
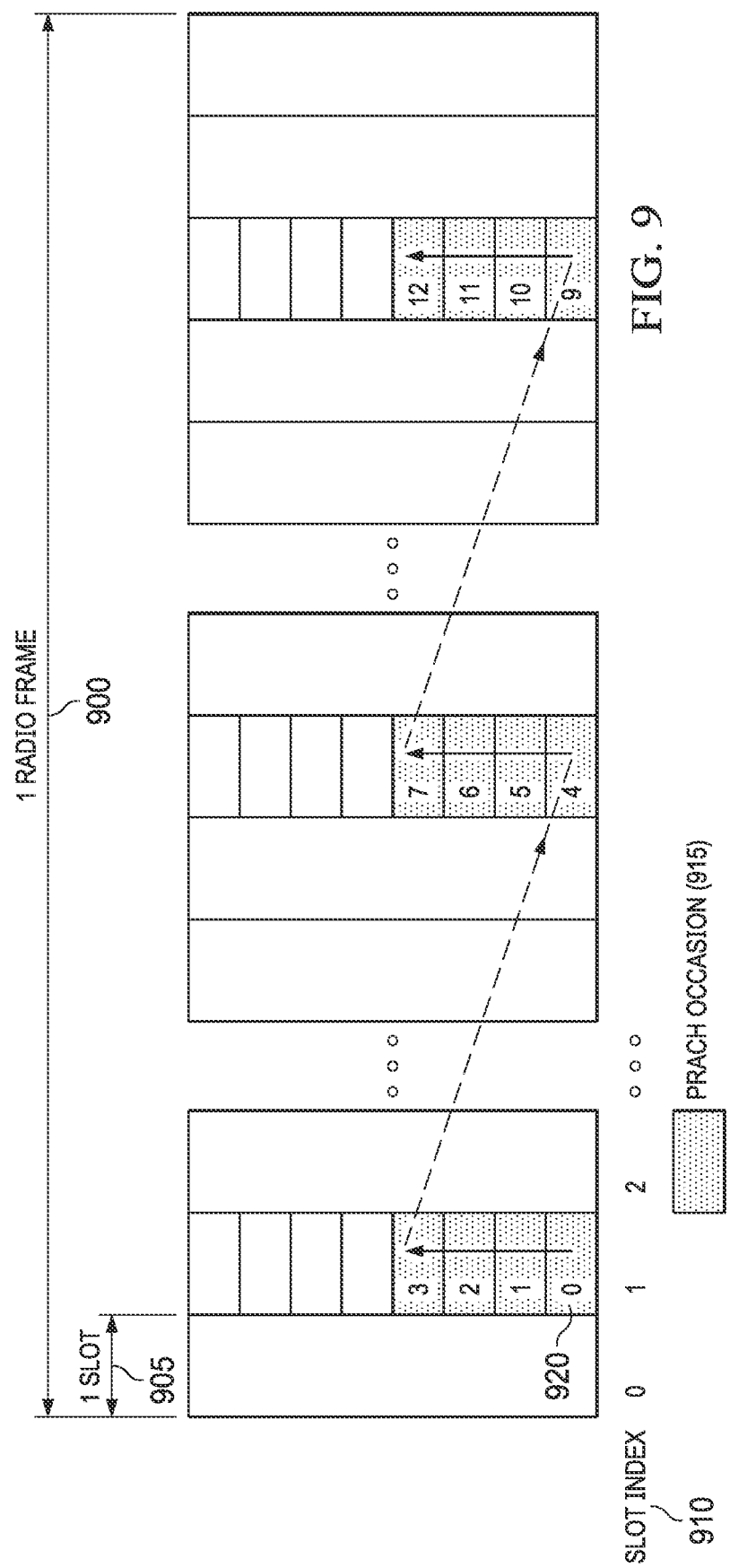
FIG. 9 illustrates an exemplary predetermined order for determining a PRACH occasion index value, which may be used to calculate a modified RA-RNTI, according to some aspects.

FIG. 9 illustrates an exemplary predetermined order for determining a PRACH occasion index value, which may be used to calculate a modified RA-RNTI, according to some aspects. As will be discussed in greater detail below with reference to FIG. 12, different solutions may be employed to determine modified RA-RNTI values to address out-of-range problems existing with the legacy RA-RNTI equation, e.g., when operating with SCS configurations larger than 120 kHz. In the example shown in FIG. 9, the RA-RNTI value may be determined based on counting the actual PRACH occasions, e.g., according to the following equation: RA-RNTI=1+P_id, wherein P_id represents the index number of the actual PRACH occasion within a system radio frame 900. Because PRACH slots are sparsely configured in the time domain, by counting the indices of only the actual PRACH occasions in the radio frame, e.g., according to a predetermined ordering scheme, the RA-RNTI value out-of-range issue described above may be avoided.

As illustrated in FIG. 9, radio frame 900 is comprised of a plurality of slots 905 across the horizontal axis of the radio frame, each slot having a slot index 910, increasing in value from left to right across the horizontal axis of the radio frame 900. The actual PRACH Occasions 915 within the various slots are labeled with indices 920 (i.e., the aforementioned P_id value), in ascending order.

According to some aspects, the predetermined order for counting the PRACH Occasions may be defined as follows: first, in an increasing order of frequency resource indices for frequency-multiplexed POs (e.g., as shown by P_id's 0-3 in FIG. 9); second, in an increasing order of time resource indices for time-multiplexed POs within a PRACH slot (not illustrated in FIG. 9); third, in increasing order of indices for the PRACH slot (e.g., as shown by P_id's 4-7 following P_id's 0-3, followed by P_id's 9-12, and so forth, in FIG. 9); and fourth, starting from a Normal Uplink carrier, and then followed by a Supplemental Uplink carrier, if the Supplemental Uplink carrier is present (not illustrated in FIG. 9).

Exemplary UE Methods for RACH Starting Symbol Determination

Figure 10:
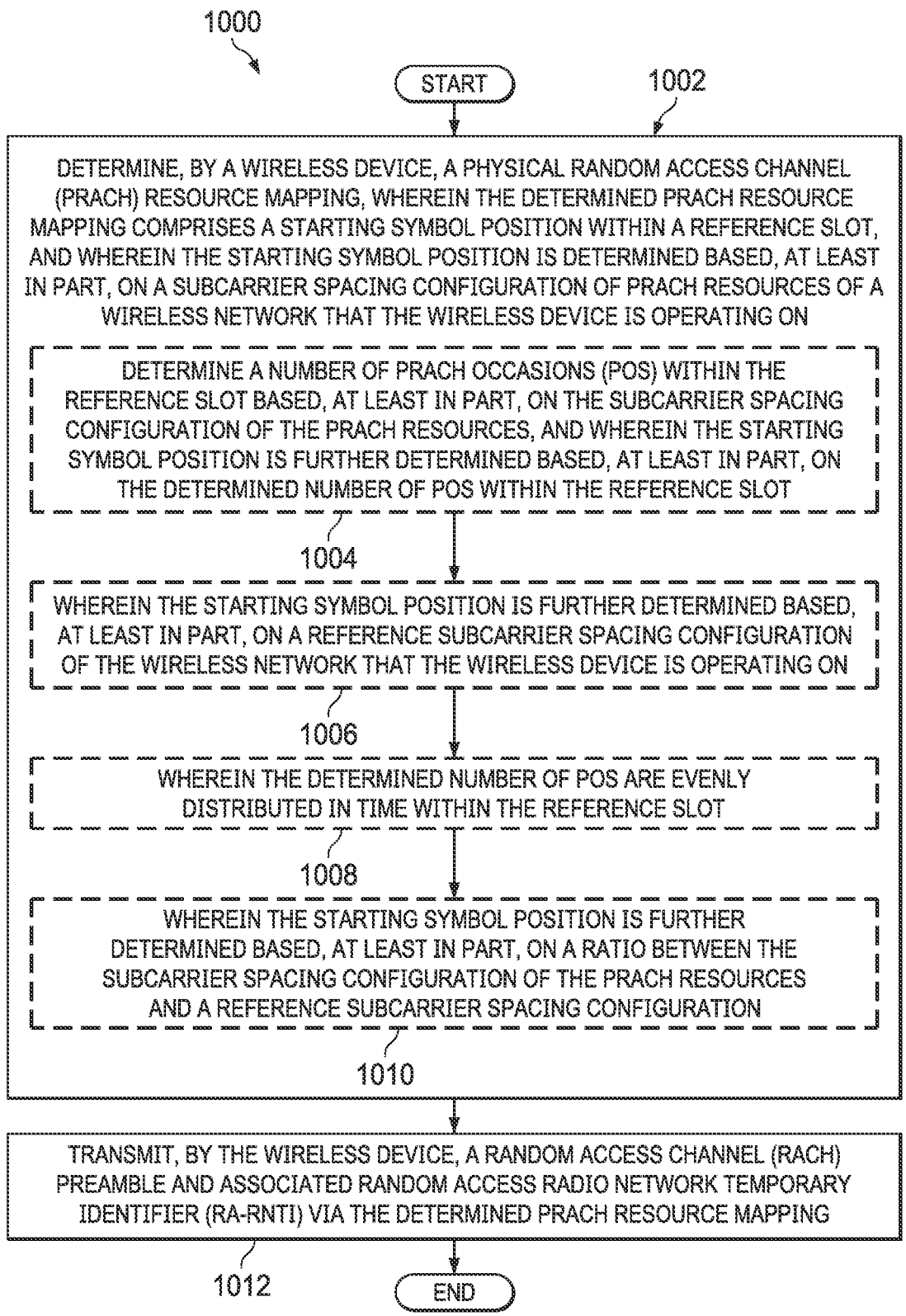
FIG. 10 is a flowchart detailing a method of determining a PRACH resource mapping by a wireless device, according to some aspects.

Turning first to FIG. 10, a flowchart 1000 is shown, detailing an exemplary method of determining a PRACH resource mapping by a wireless device, according to some aspects. Method 1000 may begin by determining, by a wireless device, a PRACH resource mapping, wherein the determined PRACH resource mapping comprises a starting symbol position (and, by extension, a starting PRACH slot position) within a reference slot, and wherein the starting symbol position is determined based, at least in part, on a subcarrier spacing configuration of PRACH resources of a wireless network that the wireless device is operating on (Step 1002). In some aspects, e.g., the subcarrier spacing configuration of the PRACH resources comprises at least one of the following: a 480 kHz subcarrier spacing configuration of the PRACH resources, and a 960 kHz subcarrier spacing configuration of the PRACH resources.

According to some aspects, at Step 1004, the method may further comprise determining a number of PRACH Occasions (POs) within the reference slot (e.g., greater than two POs) based, at least in part, on the subcarrier spacing configuration of the PRACH resources, and wherein the starting symbol position is further determined based, at least in part, on the determined number of POs within the reference slot.

According to other aspects, at Step 1006, the method may further comprise further determining the starting symbol position based, at least in part, on a reference subcarrier spacing configuration of the wireless network that the wireless device is operating on.

According to yet other aspects, at Step 1008, the method may further comprise evenly-distributing the determined number of POs in time within the reference slot.

According to still other aspects, at Step 1010, the method may further comprise further determining the starting symbol position based, at least in part, on a ratio between the subcarrier spacing configuration of the PRACH resources and a reference subcarrier spacing configuration.

Finally, at Step 1012, the method may proceed by transmitting, by the wireless device, a RACH preamble and associated Random Access Radio Network Temporary Identifier RA-RNTI, e.g., to a gNB, via the determined PRACH resource mapping from Step 1002. After the transmission at Step 1012, the method 1000 may terminate.

Exemplary Network Methods for RACH Starting Symbol Determination

Figure 11:
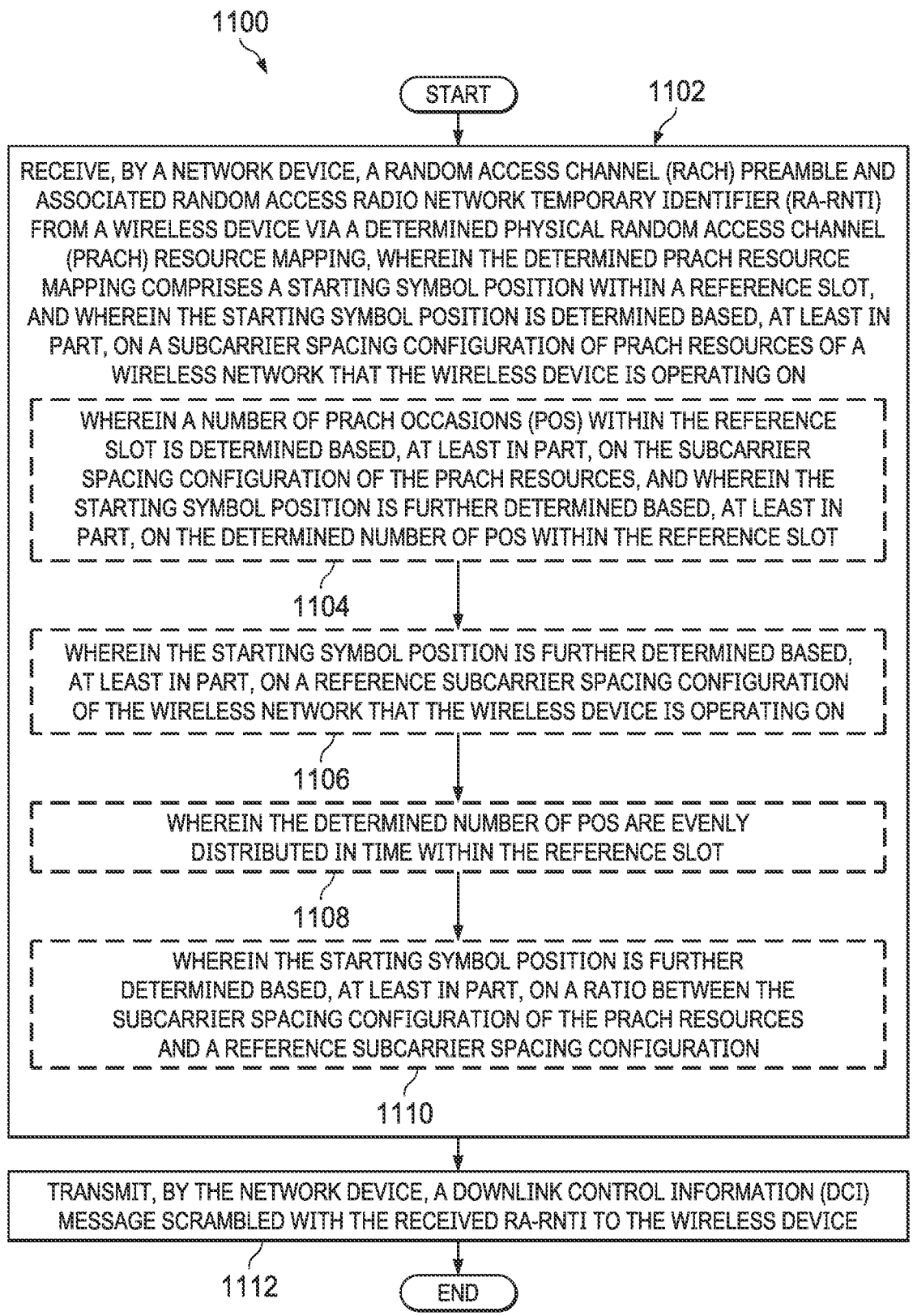
FIG. 11 is a flowchart detailing a method of receiving a RACH preamble and RA-RNTI via a determined PRACH resource mapping by a network device, according to some aspects.

FIG. 11 is a flowchart detailing a method 1100 of receiving a RACH preamble and RA-RNTI via a determined PRACH resource mapping by a network device, according to some aspects. Method 1000 may begin by receiving, by a network device, a RACH preamble and associated RA-RNTI from a wireless device via a determined PRACH resource mapping, wherein the determined PRACH resource mapping comprises a starting symbol position within a reference slot, and wherein the starting symbol position is determined based, at least in part, on a subcarrier spacing configuration of PRACH resources of a wireless network that the wireless device is operating on (Step 1102). In some aspects, e.g., the subcarrier spacing configuration of the PRACH resources comprises at least one of the following: a 480 kHz subcarrier spacing configuration of the PRACH resources, and a 960 kHz subcarrier spacing configuration of the PRACH resources.

According to some aspects, at Step 1104, the method may further comprise a number of PRACH Occasions (POs) within the reference slot (e.g., greater than two POs) being determined based, at least in part, on the subcarrier spacing configuration of the PRACH resources, and wherein the starting symbol position is further determined based, at least in part, on the determined number of POs within the reference slot.

According to other aspects, at Step 1106, the method may further comprise the starting symbol position being further determined based, at least in part, on a reference subcarrier spacing configuration of the wireless network that the wireless device is operating on.

According to yet other aspects, at Step 1108, the method may further comprise the determined number of POs being evenly-distributed in time within the reference slot.

According to still other aspects, at Step 1110, the method may further comprise the starting symbol position being further determined based, at least in part, on a ratio between the subcarrier spacing configuration of the PRACH resources and a reference subcarrier spacing configuration.

Finally, at Step 1112, the method may proceed by transmitting, by the network device, a Downlink Control Information (DCI) message scrambled with the received RA-RNTI to the wireless device. After the transmission at Step 1112, the method 1100 may terminate.

Exemplary Methods for Modified RA-RNTI Calculation

Figure 12:
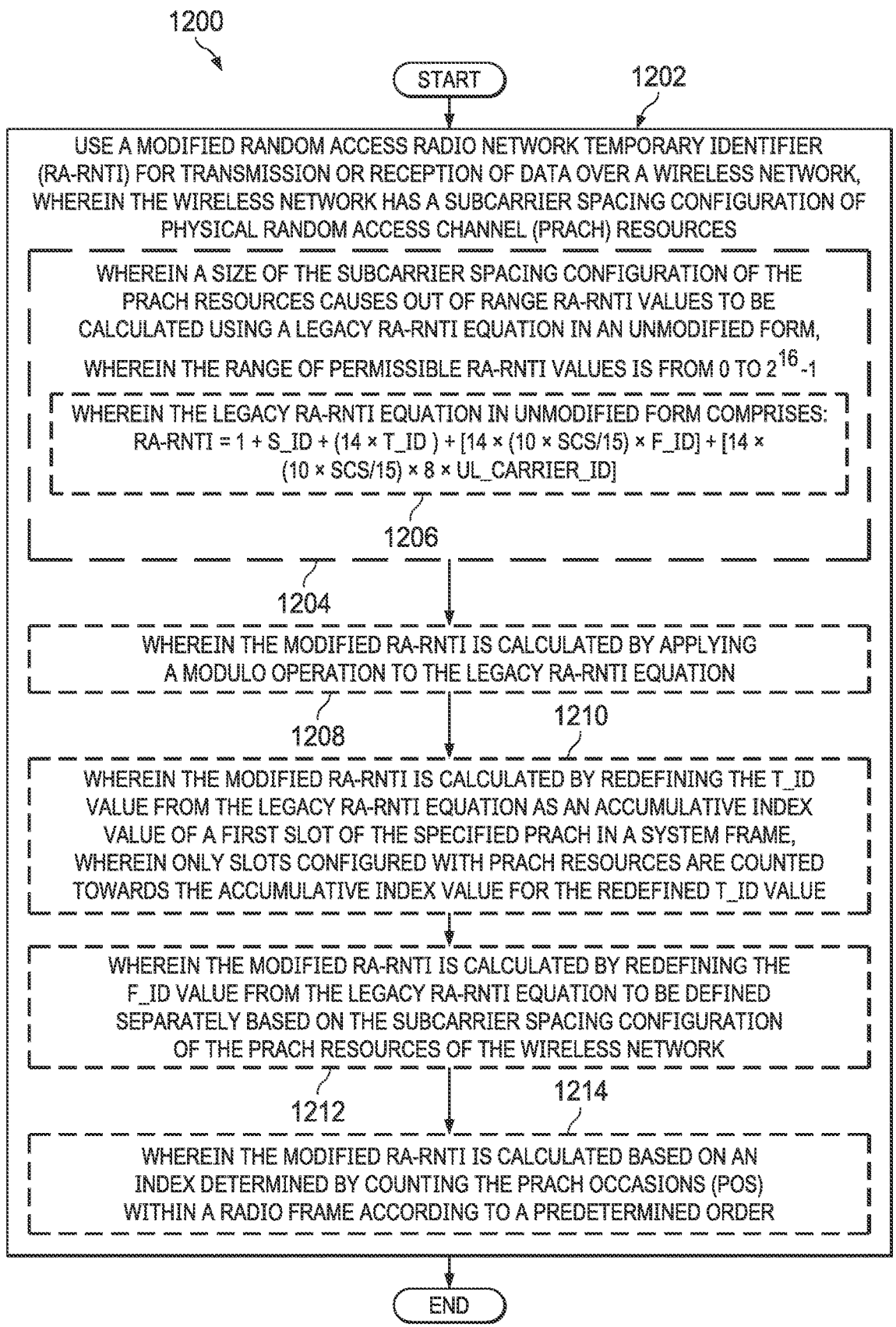
FIG. 12 is a flowchart detailing a method of using a modified RA-RNTI equation to calculate a modified RA-RNTI value for the transmission or reception of data over a wireless network, according to some aspects.

FIG. 12 is a flowchart detailing a method 1200 of using a modified RA-RNTI equation to calculate a modified RA-RNTI value for the transmission or reception of data over a wireless network, according to some aspects. As mentioned above, using larger SCS configurations for PRACH may cause out-of-range RA-RNTI values using the legacy RA-RNTI equation in unmodified form. Method 12000 may begin by a device using a modified RA-RNTI equation for transmission or reception of data over a wireless network, wherein the wireless network has a subcarrier spacing configuration of PRACH resources (Step 1202).

According to some aspects, at Step 1204, the method may further comprise the size of the subcarrier spacing configuration of the PRACH resources being large enough, such that it causes out of range RA-RNTI values to be calculated using a legacy RA-RNTI equation in an unmodified form, wherein the range of permissible RA-RNTI values is from 0 to $2^{16}-1$.

According to some such aspects (Step 1206) the legacy RA-RNTI equation referred to in Step 1204 in unmodified form comprises: RA-RNTI=1+s_id+(14×t_id)+[14×(10× SCS/15)×f_id]+[14×(10×SCS/15)×8×ul_carrier_id], wherein s_id is an index of a first Orthogonal Frequency Division Multiplexing (OFDM) symbol of a specified Physical Random Access Channel (PRACH) (0≤s_id<14), wherein t_id is an index of a first slot of the specified PRACH in a system frame (0≤t_id<80, according to the legacy RA-RNTI equation in unmodified form), wherein SCS is a subcarrier spacing configuration for the PRACH resources (SCS=120 kHz, according to the legacy RA-RNTI equation in unmodified form), wherein f_id is an index of the specified PRACH in the frequency domain (0≤f_id<8, according to the legacy RA-RNTI equation in unmodified form), and wherein ul_carrier_id is the UL carrier used for Msg1 transmission (wherein 0 is used for Normal Uplink, and 1 is used for Supplemental Uplink carrier).

According to other aspects, at Step 1208, the method may further comprise calculating the modified RA-RNTI by applying a modulo operation to the output of the legacy RA-RNTI equation, e.g., wherein the divisor of the modulo operation comprises a value of $2^{16}-1$. This will ensure that the modified RA-RNTI is never larger than $2^{16}-1$.

According to still other aspects, at Step 1210, the method may further comprise calculating the modified RA-RNTI by redefining the t_id value from the legacy RA-RNTI equation as an accumulative index value of a first slot of the specified PRACH in a system frame, wherein only slots configured with PRACH resources are counted towards the accumulative index value for the redefined t_id value. In other words, according to the techniques referred to in Step 1210, instead of indexing the RA-RNTI based on the slot index within a radio frame, the existing parameter t_id may be redefined by incrementing the accumulative index only for slots that are actually configured with PRACH resources. According to the legacy RA-RNTI equation, the fixed value of '8' unnecessarily increases the RA-RNTI value range. In some aspects, then, another parameter, n, may be introduced to avoid RA-RNTI value wastage. The n value may be equal to the value of 'msg1-FDM' configured by SIB1 message. In one example, n=2 if msg-FDM is set with '2' in the SIB1 configuration. Thus, a newly-modified RA-RNTI equation according to some aspects may comprise:

RA-RNTI=1+s_id+(14×t_id)+[14×q×f_id]+[14×q×n× ul_carrier_id], wherein t_id is the above-redefined accumulative index, n is as defined above, and q is the total number of slots with PRACH resources within a system frame.

According to yet other aspects, at Step 1212, the method may further comprise calculating the modified RA-RNTI by redefining the f_id value from the legacy RA-RNTI equation to be defined separately based on the subcarrier spacing configuration of the PRACH resources of the wireless network. For example, a maximum permissible value of the redefined f_id value from the legacy RA-RNTI equation is inversely proportional to the size of the subcarrier spacing of the PRACH resources of the wireless network. As two examples, the maximum f_id for 480 kHz SCS may be set to 4, while the maximum f_id for 960 kHz SCS may be set to 2.

Finally, according to other aspects, at Step 1214, the method may further comprise calculating the modified RA-RNTI based on an index determined by counting the POs within a radio frame according to a predetermined order, such as the predetermined order illustrated and described above, with reference to FIG. 9.

It is to be understood that, in some cases, the network device referred to in method 1200 may comprise a UE, wherein the UE transmits the modified RA-RNTI information over the wireless network, while, in other cases, the network device referred to in method 1200 may comprise a wireless station, wherein the wireless station receives the modified RA-RNTI information over the wireless network.

It is also noted that the dashed line boxes in FIGS. 10-12 in this application indicate the optionality of such steps or features. Further, one or more optional steps or features may be combined with each other in any desired fashion.

Examples

In the following sections, further exemplary aspects are provided.

According to Example 1, a wireless device is disclosed, comprising: a radio; and a processor operably coupled to the radio, wherein the processor is configured to: determine a Physical Random Access Channel (PRACH) resource mapping, wherein the determined PRACH resource mapping comprises a starting symbol position within a reference slot, and wherein the starting symbol position is determined based, at least in part, on a subcarrier spacing configuration of PRACH resources of a wireless network that the wireless device is operating on; and use the radio to transmit a Random Access Channel (RACH) preamble and associated Random Access Radio Network Temporary Identifier (RA-RNTI) via the determined PRACH resource mapping.

Example 2 comprises the subject matter of example 1, wherein the subcarrier spacing configuration of the PRACH resources comprises at least one of the following: a 480 kHz subcarrier spacing configuration of the PRACH resources, and a 960 kHz subcarrier spacing configuration of the PRACH resources.

Example 3 comprises the subject matter of example 1, wherein the processor is further configured to: determine a number of PRACH Occasions (POs) within the reference slot based, at least in part, on the subcarrier spacing configuration of the PRACH resources.

Example 4 comprises the subject matter of example 3, wherein the determined number of POs within the reference slot is larger than two.

Example 5 comprises the subject matter of example 3, wherein the starting symbol position is further determined based, at least in part, on the determined number of POs within the reference slot.

Example 6 comprises the subject matter of example 5, wherein the starting symbol position is further determined based, at least in part, on a reference subcarrier spacing configuration of the wireless network that the wireless device is operating on.

Example 7 comprises the subject matter of example 3, wherein the determined number of POs are evenly distributed in time within the reference slot.

Example 8 comprises the subject matter of example 1, wherein all slots within the reference slot are available to use as POs.

Example 9 comprises the subject matter of example 8, wherein the starting symbol position is further determined based, at least in part, on a ratio between the subcarrier spacing configuration of the PRACH resources in the wireless network that the wireless device is operating on and a reference subcarrier spacing configuration of the wireless network that the wireless device is operating on.

According to Example 10, a network device is disclosed, comprising: a radio; and a processor operably coupled to the radio, wherein the processor is configured to: use the radio to receive a Random Access Channel (RACH) preamble and associated Random Access Radio Network Temporary Identifier (RA-RNTI) from a wireless device via a determined Physical Random Access Channel (PRACH) resource mapping, wherein the determined PRACH resource mapping comprises a starting symbol position within a reference slot, and wherein the starting symbol position is determined based, at least in part, on a subcarrier spacing configuration of PRACH resources of a wireless network that the wireless device is operating on; and use the radio to transmit a Downlink Control Information (DCI) message scrambled with the received RA-RNTI to the wireless device.

Example 11 comprises the subject matter of example 10, wherein the subcarrier spacing configuration of the PRACH resources comprises at least one of the following: a 480 kHz subcarrier spacing configuration of the PRACH resources, and a 960 kHz subcarrier spacing configuration of the PRACH resources.

Example 12 comprises the subject matter of example 10, wherein a number of PRACH Occasions (POs) within the reference slot is determined based, at least in part, on the subcarrier spacing configuration of the PRACH resources.

Example 13 comprises the subject matter of example 12, wherein the determined number of POs within the reference slot is larger than two.

Example 14 comprises the subject matter of example 12, wherein the starting symbol position is further determined based, at least in part, on the determined number of POs within the reference slot.

Example 15 comprises the subject matter of example 14, wherein the starting symbol position is further determined based, at least in part, on a reference subcarrier spacing configuration of the wireless network that the wireless device is operating on.

Example 16 comprises the subject matter of example 12, wherein the determined number of POs are evenly distributed in time within the reference slot.

Example 17 comprises the subject matter of example 10, wherein all slots within the reference slot are available to use as POs.

Example 18 comprises the subject matter of example 17, wherein the starting symbol position is further determined based, at least in part, on a ratio between the subcarrier spacing configuration of the PRACH resources in the wireless network that the wireless device is operating on and a reference subcarrier spacing configuration of the wireless network that the wireless device is operating on.

According to Example 19, a network device is disclosed, comprising: a radio; and a processor operably coupled to the radio, wherein the processor is configured to: use a modified Random Access Radio Network Temporary Identifier (RA-RNTI) for transmission or reception of data over a wireless network, wherein the wireless network has a subcarrier spacing configuration of Physical Random Access Channel (PRACH) resources, wherein a size of the subcarrier spacing configuration of the PRACH resources causes out of range RA-RNTI values to be calculated using a legacy RA-RNTI equation in an unmodified form, wherein the range of permissible RA-RNTI values is from 0 to 216-1.

Example 20 comprises the subject matter of example 19, wherein the legacy RA-RNTI equation in unmodified form comprises: RA-RNTI=1+s_id+(14×t_id)+[14×(10×SCS/15)×f_id]+[14×(10×SCS/15)×8×ul_carrier_id], wherein s_id is an index of a first Orthogonal Frequency Division Multiplexing (OFDM) symbol of a specified Physical Random Access Channel (PRACH) (0≤s_id<14), wherein t_id is an index of a first slot of the specified PRACH in a system frame (0≤t_id<80, according to the legacy RA-RNTI equation in unmodified form), wherein SCS is a subcarrier spacing configuration for the PRACH resources (SCS=120 kHz, according to the legacy RA-RNTI equation in unmodified form), wherein f_id is an index of the specified PRACH in the frequency domain (0≤f_id<8, according to the legacy RA-RNTI equation in unmodified form), and wherein ul_carrier_id is the UL carrier used for Msg1 transmission (wherein 0 is used for Normal Uplink, and 1 is used for Supplemental Uplink carrier).

Example 21 comprises the subject matter of example 19, wherein the modified RA-RNTI is calculated by applying a modulo operation to the legacy RA-RNTI equation.

Example 22 comprises the subject matter of example 21, wherein the divisor of the modulo operation comprises a value of 216-1.

Example 23 comprises the subject matter of example 20, wherein the modified RA-RNTI is calculated by redefining the t_id value from the legacy RA-RNTI equation as an accumulative index value of a first slot of the specified PRACH in a system frame, wherein only slots configured with PRACH resources are counted towards the accumulative index value for the redefined t_id value.

Example 24 comprises the subject matter of example 20, wherein the modified RA-RNTI is calculated by redefining the f_id value from the legacy RA-RNTI equation to be defined separately based on the subcarrier spacing configuration of the PRACH resources of the wireless network.

Example 25 comprises the subject matter of example 24, wherein a maximum permissible value of the redefined f_id value from the legacy RA-RNTI equation is inversely proportional to the size of the subcarrier spacing of the PRACH resources of the wireless network.

Example 26 comprises the subject matter of example 20, wherein the modified RA-RNTI is calculated based on an index determined by counting the PRACH Occasions (POs) within a radio frame according to a predetermined order.

Example 27 comprises the subject matter of example 26, wherein the predetermined order is defined as follows: first, in an increasing order of frequency resource indices for frequency-multiplexed POs; second, in an increasing order of time resource indices for time-multiplexed POs within a PRACH slot; third, in increasing order of indices for the PRACH slot; and fourth, starting from a Normal Uplink carrier, and then followed by a Supplemental Uplink carrier, if the Supplemental Uplink carrier is present.

Example 28 comprises the subject matter of example 20, wherein the network device comprises a User Equipment (UE), and wherein the UE transmits the modified RA-RNTI information over the wireless network.

Example 29 comprises the subject matter of example 20, wherein the network device comprises a wireless station, and wherein the wireless station receives the modified RA-RNTI information over the wireless network.

Yet another exemplary aspect may include a method performing any or all parts of the preceding examples.

A yet further exemplary aspect may include a non-transitory computer-accessible memory medium comprising program instructions which, when executed at a device, cause the device to implement any or all parts of any of the preceding examples.

A still further exemplary aspect may include a computer program comprising instructions for performing any or all parts of any of the preceding examples.

Yet another exemplary aspect may include an apparatus comprising means for performing any or all of the elements of any of the preceding examples.

Still another exemplary aspect may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device comprising:
a radio; and
a processor operably coupled to the radio,
wherein the processor is configured to:
determine a Physical Random Access Channel (PRACH) resource mapping,
wherein the determined PRACH resource mapping comprises a starting symbol position within a reference slot, wherein the starting symbol position is determined based, at least in part, on a 480 kHz subcarrier spacing configuration of PRACH resources being used by a wireless network that the wireless device is operating on, and wherein a number of PRACH Occasions is less than or equal to two and evenly distributed in time within the reference slot, with at least one PRACH Occasion in a last index position of the reference slot; and use the radio to transmit a Random Access Channel (RACH) preamble and associated Random Access Radio Network Temporary Identifier (RA-RNTI) via the determined PRACH resource mapping during at least one of the number of PRACH Occasions.

2. The wireless device of claim 1, wherein all slots within the reference slot are available to use as PRACH Occasions.

3. A network device comprising:
a radio; and
a processor operably coupled to the radio,
wherein the processor is configured to:
use the radio to receive a Random Access Channel (RACH) preamble and associated Random Access Radio Network Temporary Identifier (RA-RNTI) from a wireless device via a determined Physical Random Access Channel (PRACH) resource mapping and during at least one of a number of PRACH Occasions, wherein the determined PRACH resource mapping comprises a starting symbol position within a reference slot, wherein the starting symbol position is determined based, at least in part, on a 960 kHz subcarrier spacing configuration of PRACH resources being used by a wireless network that the wireless device is operating on; and wherein the number of PRACH Occasions is less than or equal to two and evenly distributed in time within the reference slot, with at least one PRACH Occasion in a last index position of the reference slot; and use the radio to transmit a Downlink Control Information (DCI) message scrambled with the received RA-RNTI to the wireless device.

4. The network device of claim 3, wherein all slots within the reference slot are available to use as PRACH Occasions.

5. A method, comprising:
determining, by a wireless device, a Physical Random Access Channel (PRACH) resource mapping,
wherein the determined PRACH resource mapping comprises a starting symbol position within a reference slot,
wherein the starting symbol position is determined based, at least in part, on a 480 kHz subcarrier spacing configuration of PRACH resources being used by a wireless network that the wireless device is operating on, and
wherein a number of PRACH Occasions is less than or equal to two and evenly distributed in time within the reference slot, with at least one PRACH Occasion in a last index position of the reference slot; and
transmitting, by the wireless device, a Random Access Channel (RACH) preamble and associated Random Access Radio Network Temporary Identifier (RA-RNTI) to a network device via the determined PRACH resource mapping during at least one of the number of POs.

* * * * *